United States Patent
Hagiwara et al.

(10) Patent No.: US 11,424,086 B2
(45) Date of Patent: Aug. 23, 2022

(54) OPERATION DEVICE AND OPERATION MEMBER

(71) Applicant: ALPS ALPINE CO., LTD., Tokyo (JP)

(72) Inventors: Yasuji Hagiwara, Miyagi (JP); Daisuke Takai, Miyagi (JP); Takashi Sasaki, Miyagi (JP); Takeshi Masaki, Tokyo (JP); Toshiki Nakamura, Miyagi (JP); Masaki Ota, Miyagi (JP); Hiroshi Shigetaka, Miyagi (JP); Masahiro Takata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/165,123

(22) Filed: Feb. 2, 2021

(65) Prior Publication Data

US 2021/0159027 A1    May 27, 2021

Related U.S. Application Data

(63) Continuation of application No. PCT/JP2019/023538, filed on Jun. 13, 2019.

(30) Foreign Application Priority Data

Aug. 8, 2018  (JP) .............................. JP2018-149572

(51) Int. Cl.
*H01H 3/04* (2006.01)
*H01H 3/02* (2006.01)
(Continued)

(52) U.S. Cl.
CPC ................ *H01H 3/02* (2013.01); *H01H 3/04* (2013.01); *H01H 3/08* (2013.01); *H01H 3/12* (2013.01);
(Continued)

(58) Field of Classification Search
CPC .... H01H 23/143; H01H 23/30; H01H 23/025; H01H 2300/03; H01H 23/145;
(Continued)

(56) References Cited

U.S. PATENT DOCUMENTS

| | | | |
|---|---|---|---|
| 7,105,762 B1 * | 9/2006 | Lee | H01H 23/025 |
| | | | 200/449 |
| 10,483,057 B2 * | 11/2019 | Sawada | G06F 3/0443 |
| 2017/0177102 A1 | 6/2017 | Long | |

FOREIGN PATENT DOCUMENTS

| | | |
|---|---|---|
| JP | 2009-218785 | 9/2009 |
| JP | 2011-243399 | 12/2011 |
| JP | 2018-073731 | 5/2018 |

OTHER PUBLICATIONS

International Search Report for PCT/JP2019/023538 dated Sep. 3, 2019.

* cited by examiner

*Primary Examiner* — Ahmed M Saeed

(74) *Attorney, Agent, or Firm* — IPUSA, PLLC

(57) ABSTRACT

An operation device includes a housing, an operation member, and a detector. The housing includes an electrically conductive portion on a surface thereof. The operation member is supported by the housing such that the operation member is movable in response to an operation by an operation body, and is configured to be capacitively coupled to the operation body and to the electrically conductive portion. The detector is configured to detect whether the operation body is in proximity to the operation member based on a change in capacitance at the electrically conductive portion.

3 Claims, 10 Drawing Sheets

(51) Int. Cl.
*H01H 3/08* (2006.01)
*H01H 3/12* (2006.01)

(52) U.S. Cl.
CPC ............... *H01H 2003/0293* (2013.01); *H01H 2239/006* (2013.01)

(58) Field of Classification Search
CPC .. H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 3/02; H01H 3/04; H01H 3/08; H01H 2003/0293; H01H 2239/006; H01H 33/6642; H01H 33/666; G06F 3/033

See application file for complete search history.

OPERATION DEVICE AND OPERATION MEMBER

CROSS-REFERENCE TO RELATED APPLICATIONS

This application is a continuation of International Application No. PCT/JP2019/023538, filed on Jun. 13, 2019 and designating the U.S., which claims priority to Japanese Patent Application No. 2018-149572 filed on Aug. 8, 2018. The contents of these applications are incorporated herein by reference in their entirety.

BACKGROUND OF THE INVENTION

1. Field of the Invention

The disclosures herein relate to an operation device and an operation member.

2. Description of the Related Art

Conventionally, operation devices that include operation levers for tilting operations are utilized in game consoles and vehicles (see Patent Document 1, for example).

However, according to the technology described in Patent Document 1, an operation lever (a movable part) is equipped with a proximity sensor that is configured to detect the location of an operation body such as a user's finger relative to a stick. With such a configuration, the degree of freedom in arranging components may be decreased and the life of an operation device may be shortened.

RELATED-ART DOCUMENTS

Patent Documents

Patent Document 1: U.S. Patent Publication No. 2017/0177102

SUMMARY OF THE INVENTION

According to at least one embodiment, an operation device includes a housing, an operation member, and a detector. The housing includes an electrically conductive portion on a surface thereof. The operation member is supported by the housing such that the operation member is movable in response to an operation by an operation body, and is configured to be capacitively coupled to the operation body and to the electrically conductive portion. The detector is configured to detect whether the operation body is in proximity to the operation member based on a change in capacitance at the electrically conductive portion.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
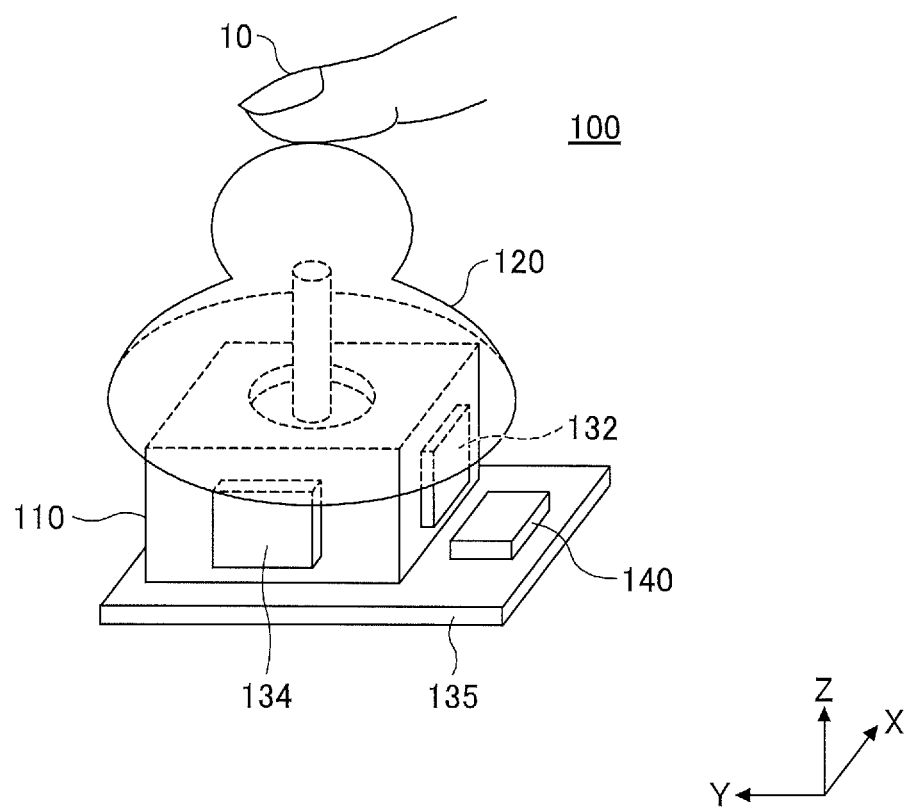
FIG. 1 is a perspective view of the exterior of an operation device according to a first embodiment.

According to at least one embodiment, an operation device includes a movable part such as a stick that is not equipped with a proximity circuit, thereby increasing the degree of freedom in arranging components and extending the life of the operation device.

In the following, embodiments of the present invention will be described with reference to the accompanying drawings. In the drawings, a Z-axis direction is referred to as an upper-lower direction, an X-axis direction is referred to as a forward-backward direction, and a Y-axis direction is referred to as a left-right direction for the sake of convenience.

(Overview of Operation Device 100)

FIG. 1 is a perspective view of the exterior of an operation device 100 according to a first embodiment. The operation device 100 illustrated in FIG. 1 includes an operation lever (an example of an "operation member") configured to be tiltable by an operation body 10. For example, the operation device 100 may be installed in an operation target device 20 such as a game console or an in-vehicle device, and may be used for various application operations with respect to the operation target device 20. As illustrated in FIG. 1, the operation lever 120 is provided at the upper side of a housing 110. The operation lever 120 can be tilted in the forward-backward direction (X-axis direction) and the left-right direction (Y-axis direction) by the operation body 10. In FIG. 1 the operation body 10 is depicted as an operator's finger, but the operation body 10 is not limited thereto.

(Configuration of Operation Device 100)

Figure 2:
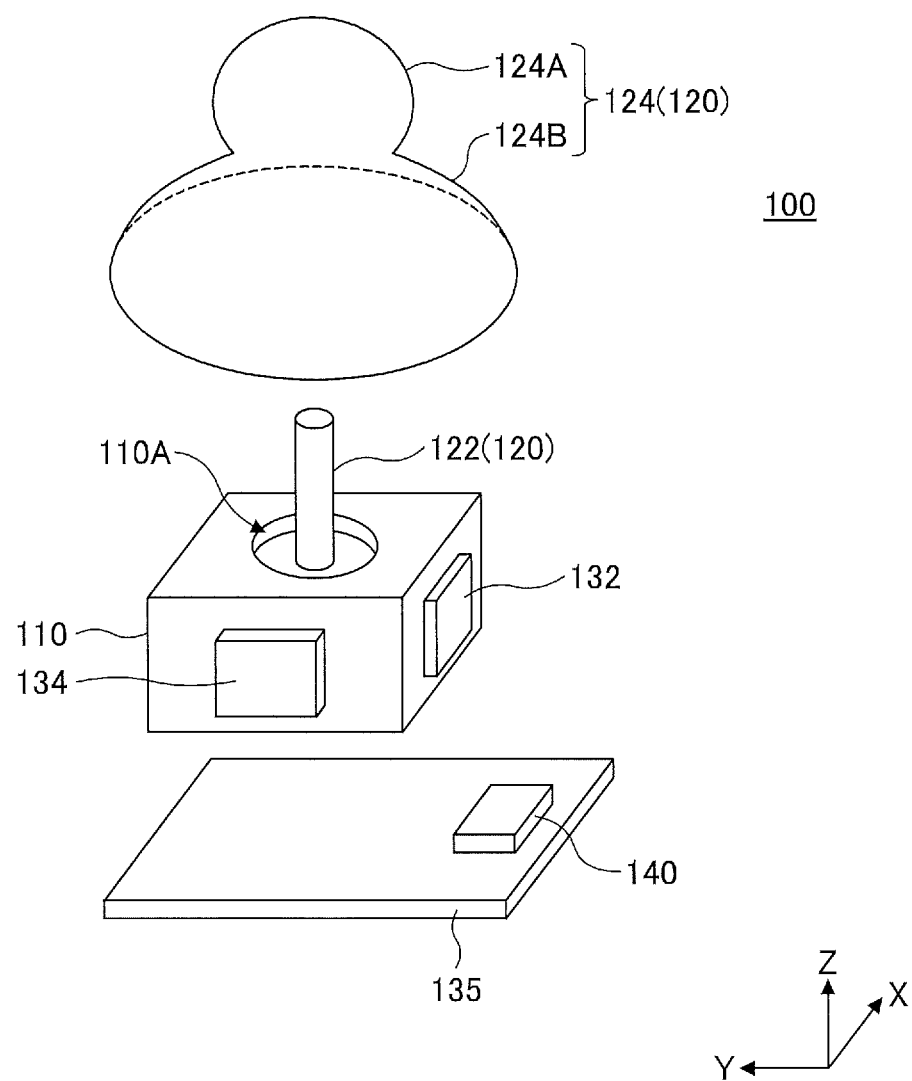
FIG. 2 is an exploded perspective view of the operation device according to the first embodiment.
Figure 3A:
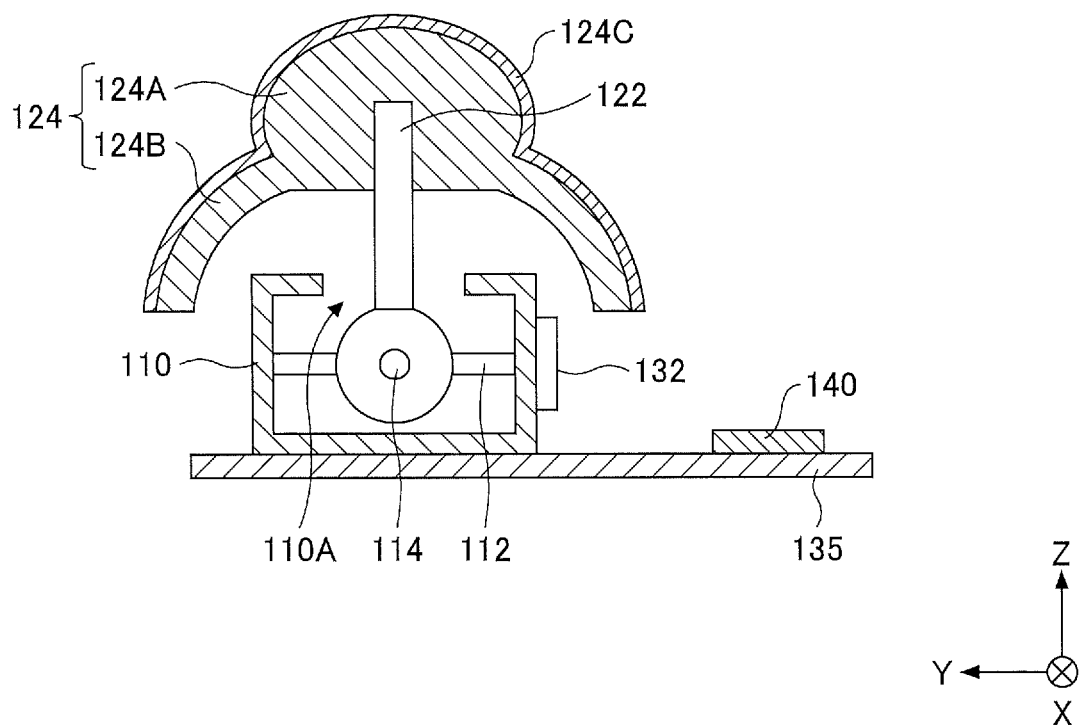
FIG. 3A is a cross-sectional view in the YZ plane of (a first example of) the operation device according to the first embodiment.
Figure 3B:
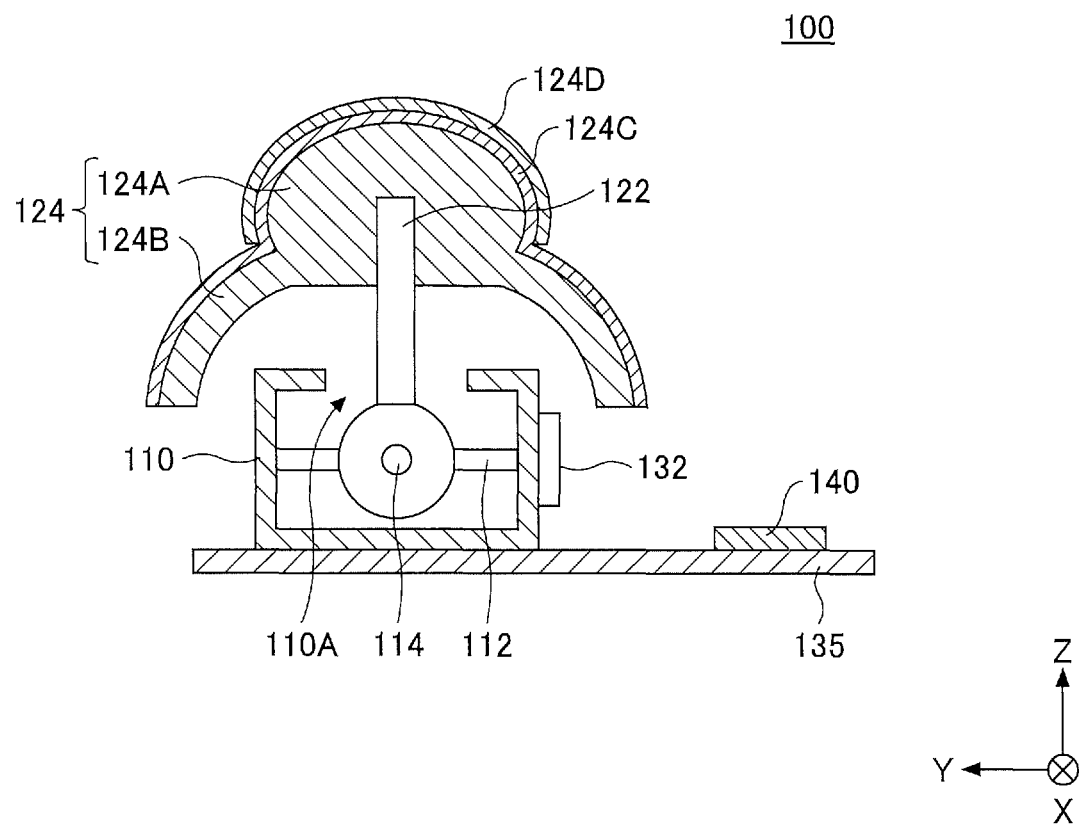
FIG. 3B is a cross-sectional view in the YZ plane of (a second example of) the operation device according to the first embodiment.

FIG. 2 is an exploded perspective view of the operation device 100 according to the first embodiment. FIG. 3A and FIG. 3B are cross-sectional views in the YZ plane of (first and second examples of) the operation device 100 according to the first embodiment. As illustrated in FIG. 2 and FIGS. 3A and 3B, the operation device 100 includes the housing 110, the operation lever 120, an encoder 132, an encoder 134, a substrate 135, and a control circuit 140.

The housing 110 has an approximately rectangular parallelepiped shape. The housing 110 supports the operation lever 120 such that the operation lever 120 can be tilted. The surface, serving as a frame portion, of the housing 110 is formed of an electrically conductive material (such as a metal plate). Accordingly, the entire surface of the housing 110 functions as an "electrically conductive portion". The outer periphery of the housing 110 is surrounded by an operation knob 124 of the operation lever 120. Accordingly, the surface of the housing 110 can be capacitively coupled to the operation knob 124.

The operation lever 120 can be tilted in the forward-backward direction (X-axis direction) and the left-right direction (Y-axis direction), and includes a shaft 122 and the operation knob 124. The shaft 122 is a rod-shaped member that protrudes upward from an opening 110A formed on the upper surface of the housing 110. The housing 110 supports the shaft 122 such that the shaft 122 can be tilted in the forward-backward direction (X-axis direction) and the left-right direction (Y-axis direction). When the shaft 122 is released by the operation body 10, the shaft 122 automatically returns to the neutral position by an elastic object such as a spring. The operation knob 124 is attached to the tip of the shaft 122.

Because the operation knob 124 is attached to the shaft 122, the contact area of the operation knob 124 with the operation body 10 can be increased, thereby improving the operability. The operation knob 124 is formed of a relatively rigid material (such as a resin, silicone, or rubber).

The operation knob 124 includes an operation portion 124A and an umbrella portion 124B. The operation portion 124A is a portion that is attached to the tip of the shaft 122 and contacted by the operation body 10. The operation portion 124A has an approximately elliptical shape; however, the operation portion 124A may have any other shape (such as a circular shape or a flat plate shape). The umbrella portion 124B is curved outward and extends downward from the lower end of the operation portion 124A along the outer periphery of the operation portion 124A. The umbrella portion 124B is located in proximity to the surface of the housing 110 and surrounds the outer periphery of the housing 110.

As illustrated in FIG. 3A, an electrically conductive layer 124C is formed on the surface of the operation knob 124. For example, the electrically conductive layer 124C can be formed by coating the surface of the operation knob 124 with electrically conductive paint (such as paint that includes carbon). In this manner, the entire surface of the operation knob 124 becomes electrically conductive, and can be capacitively coupled to the operation body 10 and to the housing 110. Specifically, the operation portion 124A (serving as a "first capacitive coupling portion") of the operation knob 124 can be capacitively coupled to the operation body 10 that has approached the operation portion 124A. In addition, the umbrella portion 124B (serving as a "second capacitive coupling portion") of the operation knob 124 can be capacitively coupled to the surface of the housing 110 located in close proximity to the umbrella portion 124B.

Further, as illustrated in FIG. 3B, an insulating layer 124D (such as an elastomer) may be layered on the electrically conductive layer 124C formed on the surface of the operation knob 124. Alternatively, the operation knob 124 itself may be electrically conductive, and the insulating layer 124D may be formed on the surface of the operation knob 124. In this case, the electrically conductive layer 124C is not necessarily formed on the operation knob 124. Accordingly, while the operation knob 124 can be capacitively coupled to the operation body 10 and to the housing 110, the insulating layer 124D formed on the surface of the operation knob 124 enables stable measurement of capacitive coupling. Note that the insulating layer 124D may cover the entirety of the electrically conductive layer 124C, or may cover a part of the electrically conductive layer 124C that is operated by the operation body 10.

The encoder 132 and the encoder 134 are attached to the side surfaces of the housing 110. The encoder 132 detects the amount of operation in the X-axis direction of the operation lever 120 (the amount of rotation of a rotating shaft 112 that rotates in the X-axis direction), and outputs an operation signal (analog signal) corresponding to the amount of operation in the X-axis direction of the operation lever 120. The encoder 134 detects the amount of operation in the Y-axis direction of the operation lever 120 (the amount of rotation of a rotating shaft 114 that rotates in the Y-axis direction), and outputs an operation signal (analog signal) corresponding to the amount of operation in the Y-axis direction of the operation lever 120. The encoder 132 and the encoder 134 may be optical rotary encoders.

The substrate 135 is a flat-plate-shaped member, and the housing 110 and the control circuit 140 are mounted on the upper surface of the substrate 135. The substrate 135 may be a rigid substrate such as a printed wiring board (PWB) or a printed circuit board (PCB).

The control circuit 140 is electrically connected to the surface of the housing 110, the encoder 132, and the encoder 134 via wiring or metal terminals (not illustrated). The control circuit 140 performs various types of control for the operation device 100 (such as applying a voltage to the surface of the housing 110, detecting capacitance at the surface of the housing 110, acquiring operation signals from the encoders 132 and 134, processing the operation signals, and outputting the operation signals to the operation target device 20). The control circuit 140 includes an integrated circuit (IC), a drive circuit, and an analog-to-digital (A/D) converter in order to implement functions as will be described with reference to FIG. 4.

(Electrical Connection Configuration of Operation Device 100)

Figure 4:
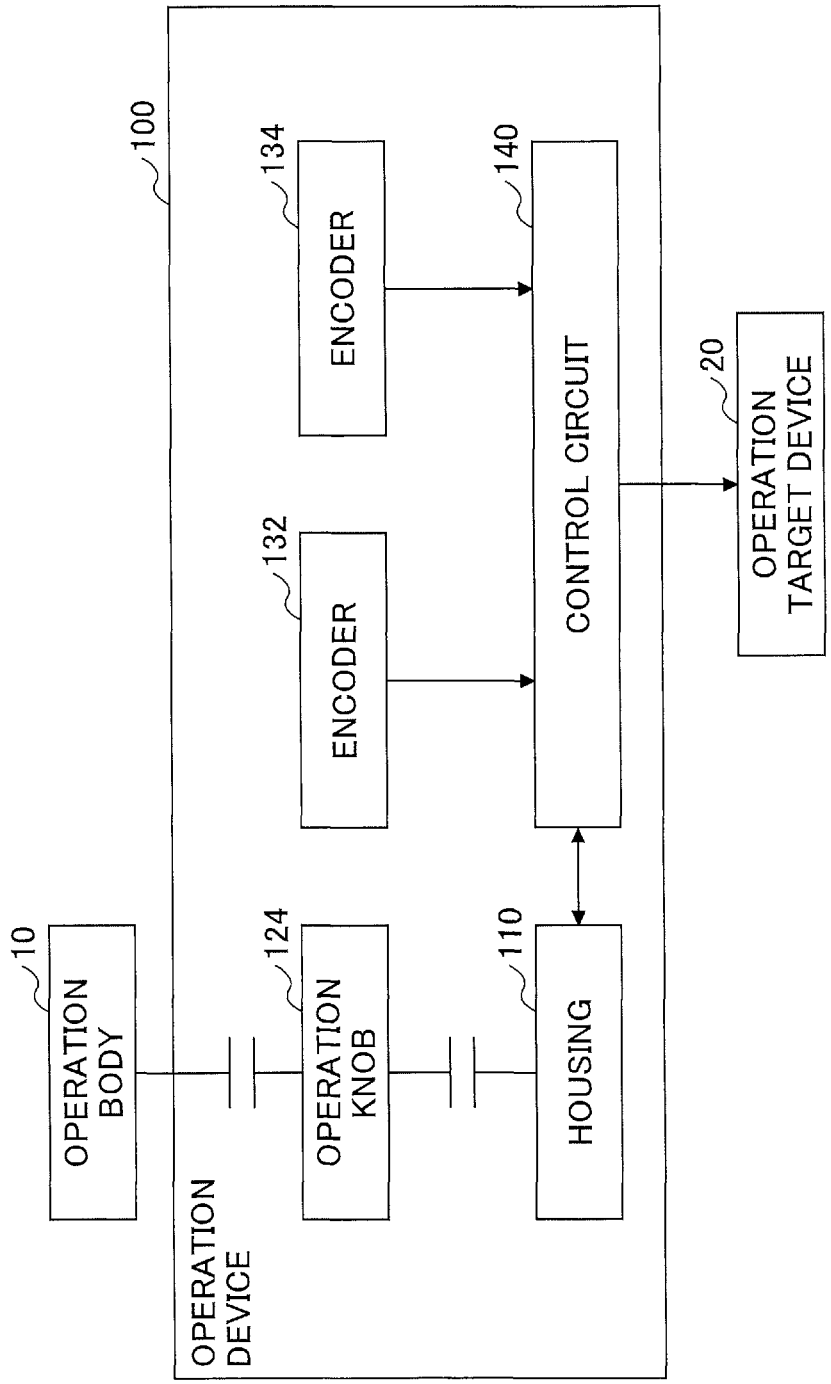
FIG. 4 is a block diagram illustrating an electrical connection configuration of the operation device according to the first embodiment.

FIG. 4 is a block diagram illustrating an electrical connection configuration of the operation device 100 according to the first embodiment. Because the operation knob 124 includes the electrically conductive layer 124C on the surface thereof, the operation knob 124 can be capacitively coupled to the surface of the housing 110 and to the operation body 10 as illustrated in FIG. 4. Accordingly, the capacitance at the surface of the housing 110 changes in response to the proximity of the operation body 10 to the operation knob 124. The control circuit 140 is electrically connected to the surface of the housing 110 via wiring or the like. Therefore, the control circuit 140 can cause the surface of the housing 110 to function as a detection electrode by applying an AC voltage to the surface of the housing 110. Further, the control circuit 140 can detect a current value corresponding to a change in capacitance at the surface of the housing 110, and can determine whether the operation body 10 is in proximity to the operation knob 124 based on the current value. Further, the control circuit 140 is electrically connected to the encoders 132 and 134 and the operation target device 20 via wiring or the like. Accordingly, the control circuit 140 can receive operation signals from the encoders 132 and 134, and output the operation signals to the operation target device 20 after performing various processes (such as an analog-to-digital conversion process and a process for correcting an operation position) on the operation signals.

(Functional Configuration of Control Circuit 140)

Figure 5:
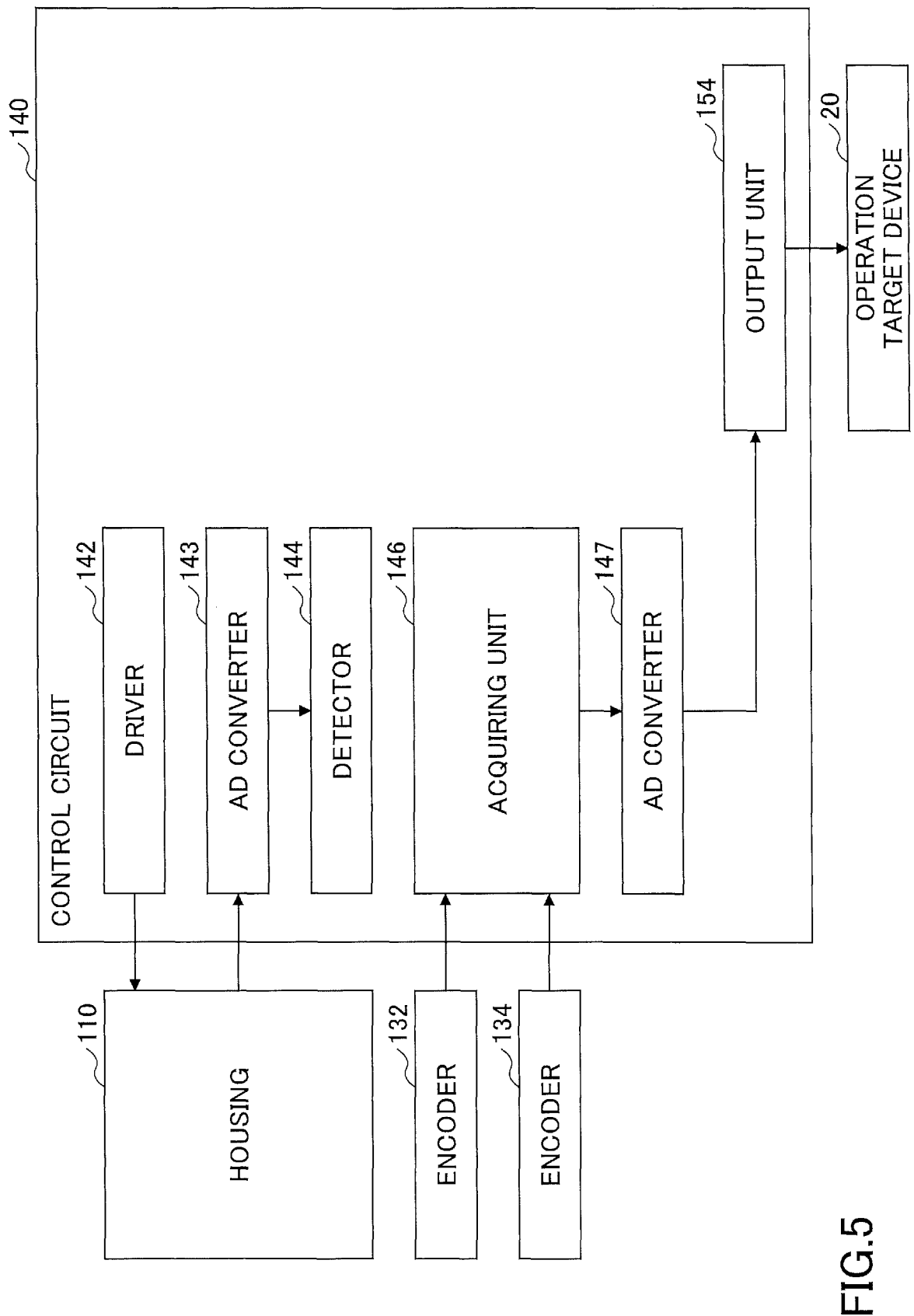
FIG. 5 is a block diagram illustrating a functional configuration of a control circuit according to the first embodiment.

FIG. 5 is a block diagram illustrating a functional configuration of the control circuit 140 according to the first embodiment. As illustrated in FIG. 5, the control circuit 140 includes a driver 142, an AD converter 143, a detector 144, an acquiring unit 146, an AD converter 147, and an output unit 154.

The driver 142 applies an AC voltage to the surface of the housing 110 such that the surface of the housing 110 functions as a detection electrode. The AD converter 143 converts an analog signal indicating a current value at the surface of the housing 110 to a digital signal.

The detector 144 detects whether the operation body 10 is in proximity to the operation knob 124 based on a change in the current value (indicated by the signal converted by the AD converter 143) at the surface of the housing 110 to which the AC voltage is applied by the driver 142. The capacitance at the surface of the housing 110 changes as the proximity of the operation body 10 to the operation knob 124 changes. Specifically, the current value at the surface of the housing 110 increases as the operation body 10 approaches the operation knob 124. Accordingly, the detector 144 can detect whether the operation body 10 is in proximity to the operation knob 124 based on the current value at the surface of the housing 110. For example, if the current value at the surface of the housing 110 is less than a predetermined threshold th1, the detector 144 determines that the operation body 10 is not in proximity to the operation knob 124. If the current value at the surface of the housing 110 is greater than or equal to the predetermined threshold th1, the detector 144 determines that the operation body 10 is in proximity to the operation knob 124. Note that the predetermined threshold th1 is stored in a memory beforehand. The predetermined threshold th1 may be any appropriate value that can determine whether the operation body 10 is in proximity to the operation knob 124. Further, the predetermined threshold th1 may be changed by an external information processing apparatus.

The acquiring unit 146 acquires operation signals (analog signals) corresponding to the operation of the operation lever 120 from the encoders 132 and 134. Specifically, the acquiring unit 146 acquires an operation signal corresponding to the amount of operation in the X-axis direction of the operation lever 120 from the encoder 132. In addition, the acquiring unit 146 acquires an operation signal corresponding to the amount of operation in the Y-axis direction of the operation lever 120 from the encoder 134. The AD converter 147 converts the operation signals (analog signals) acquired by the acquiring unit 146 into digital signals.

The output unit 154 outputs the converted operation signals to the operation target device 20. The operation target device 20 can execute a target application with high accuracy based on the operation signals received from the output unit 154.

As described above, in the operation device 100 according to the present embodiment, an electrical connection is made to the surface of the housing 110, which is a fixed portion, instead of being made to the operation lever 120, which is a movable part. Accordingly, in the operation device 100 according to the present embodiment, the electrical connection can be made relatively easily in a manufacturing process, and the durability of electrical connection components can also be enhanced. In addition, electrical connectors such as wiring do not interfere with the movement of the operation lever 120, thus improving the operability of the operation lever 120.

Further, in the operation device 100 according to the present embodiment, the operation lever 120 can be capacitively coupled to the operation body 10 and the housing 110 by forming the electrically conductive layer 124C on the surface of the operation lever 120. Accordingly, in the operation device 100 according to the present embodiment, the operation lever 120 can be readily capacitively coupled to the operation body 10 and the housing 110, regardless of the shape and the material of the operation lever 120 and without a design change to the shape and the material of the operation lever 120.

Further, in the operation device 100 according to the present embodiment, the operation knob 124 includes the operation portion 124A configured to be operated by the operation body 10, and includes the umbrella portion 124B that extends downward from the operation portion 124A and surrounds the outer periphery of the housing 110. Accordingly, in the operation device 100 according to the present embodiment, the operation knob 124 can be efficiently capacitively coupled to both the operation body 10 and the housing 110 without increasing the number of components of the operation knob 124.

Further, in the operation device 100 according to the present embodiment, the frame portion constituting the surface of the housing 110 functions as the electrically conductive portion for detection of capacitance. Accordingly, in the operation device 100 according to the present embodiment, changes in capacitance at the housing 110 can be detected without increasing the number of components of the housing 110.

Although the embodiment of the present invention has been described in detail above, the present invention is not limited to the particulars of the above-described embodiment. Variations and modifications may be made without departing from the scope of the subject matter recited in the claims.

For example, the configuration of the operation lever is not limited to the above-described configuration, as long as the operation lever can be capacitively coupled to the operation body and the housing.

For example, the operation lever may include an operation knob and a shaft that are integrally formed. Further, instead of the electrically conductive layer, an electrically conductive member (such as an electric wire) may be provided on the surface of or in the operation knob.

The operation knob may be formed of an electrically conductive material. In this case, the entirety of the operation knob becomes electrically conductive. Therefore, the electrically conductive layer is not necessarily formed on the surface of the operation knob.

Further, in the operation device 100 according to the present embodiment, the electrically conductive layer is formed on the entire surface of the operation lever; however, the present invention is not limited thereto, and the electrically conductive layer may be formed on a part of the surface of the operation lever, as long as the operation lever can be capacitively coupled to the operation body and the housing.

Further, in the operation device 100 according to the present embodiment, the entire surface of the housing is formed of an electrically conductive material and functions as the "electrically conductive portion". However, the present invention is not limited thereto, and a part of the surface of the housing may be formed of an electrically conductive material, and may function as an "electrically conductive portion". For example, a metal plate may be attached to the surface of the housing, and the metal plate attached to the surface of the housing may function as an "electrically conductive portion".

Further, in above-described embodiment, the operation lever is configured to be tilted in both the X-axis direction and the Y-axis direction. However, the present invention is not limited thereto, and the operation lever may be configured to be tilted in either the X-axis direction or the Y-axis direction.

Second Embodiment

Figure 6:
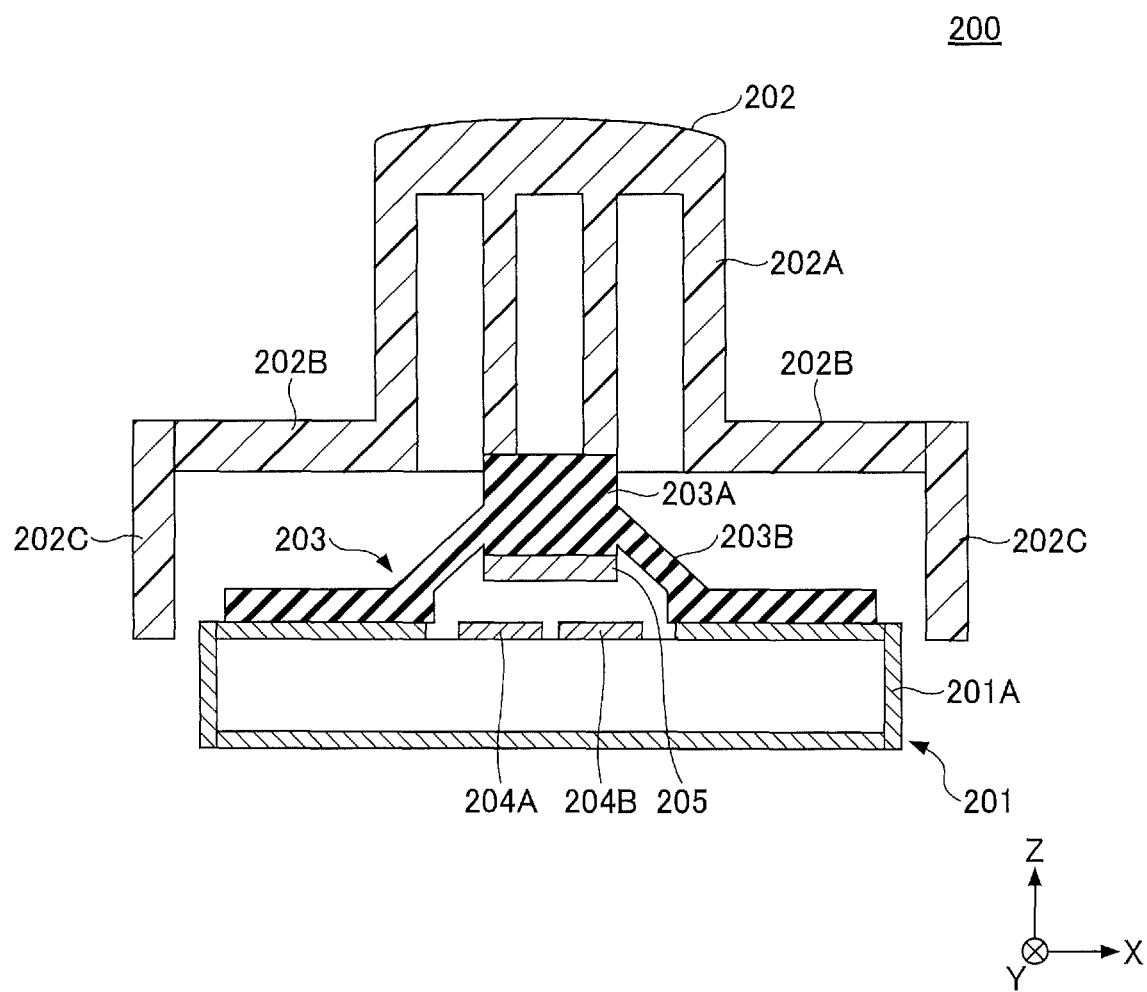
FIG. 6 is a cross-sectional view of a push switch according to a second embodiment.

Next, a push switch according to a second embodiment will be described with reference to FIG. 6. FIG. 6 is a cross-sectional view of a push switch 200 according to the second embodiment.

As illustrated in FIG. 6, the push switch 200 includes a housing 201, a pressing member 202, a rubber contact 203, fixed contacts 204A and 204B, and a movable contact 205.

The housing 201 holds the components (the rubber contact 203 and the fixed contacts 204A and 204B). The surface of the housing 201 is covered by an electrically conductive portion 201A formed of an electrically conductive material (such as a metal plate). The fixed contacts 204A and 204B are aligned at the center of the upper surface of the housing 201.

The pressing member 202 is configured to be pressed by an operator. The pressing member 202 includes an operation portion 202A, a flange portion 202B, and a side wall portion 202C. The operation portion 202A is a columnar portion configured to be pressed by the operator. The bottom surface of the operation portion 202A is fixed to the rubber contact 203 (the upper surface of a center portion 203A). The flange portion 202B is a horizontal portion that extends outward from the lower end of the operation portion 202A along the outer periphery of the operation portion 202A. The side wall portion 202C is a wall portion that extends downward from the outer edge of the flange portion 202B along the outer periphery of the flange portion 202B.

The rubber contact 203 is provided on the upper surface of the housing 201. The rubber contact 203 includes the center portion 203A and a leg portion 203B. The rubber contact 203 is formed of an elastic material such as rubber or silicone. Because the pressing member 202 is fixed to the upper surface of the center portion 203A, the center portion 203A moves up and down together with the pressing member 202. The movable contact 205 is provided on the bottom surface of the center portion 203A. The leg portion 203B supports the outer peripheral surface of the center portion 203A. Upon the pressing member 202 being pressed, the leg portion 203B elastically deforms, thereby causing the center portion 203A to be moved down. Accordingly, the center portion 203A can cause the movable contact 205 to be electrically connected to the fixed contacts 204A and 204B.

In the push switch 200 having the above-described configuration, the pressing member 202 is in the initial position when the pressing member 202 is not pressed by the operator as illustrated in FIG. 6. At this time, the movable contact 205 is spaced apart from the fixed contacts 204A and 204B. That is, the push switch 200 is in an off-state in which the fixed contact 204A is not electrically connected to the fixed contact 204B.

Conversely, in the push switch 200, upon the pressing member 202 being pressed by the operator, the leg portion 203B of the rubber contact 203 elastically deforms, thereby causing the center portion 203A of the rubber contact 203 to be moved down. As a result, the movable contact 205 contacts the fixed contacts 204A and 204B. That is, the push switch 200 enters an on-state in which the fixed contact 204A is electrically connected to the fixed contact 204B.

Further, upon the pressing member 202 being released by the operator, the pressing member 202 returns to the initial position by an elastic return force of the leg portion 203B. Accordingly, the push switch 200 enters the off-state in which the fixed contact 204A is not electrically connected to the fixed contact 204B as illustrated in FIG. 6.

The pressing member 202 includes the side wall portion 202C. The side wall portion 202C is spaced apart from the housing 201 by a given distance and is parallel to the side surfaces of the housing 201. Upon the pressing member 202 being pressed, the side wall portion 202C is moved up and down alongside the housing 201. Further, the pressing member 202 including the side wall portion 202C is formed of an electrically conductive material (such as an electrically conductive resin). In addition, the surface of the housing 201 is covered by the electrically conductive portion 201A formed of an electrically conductive material. Accordingly, in the push switch 200 according to the second embodiment, the pressing member 202 can be capacitively coupled to the operation body (such as a user's finger) and the surface of the housing 201. Note that the operation portion 202A of the pressing member 202 corresponds to the "first capacitive coupling portion configured to be capacitively coupleable to the operation body", and the side wall portion 202C corresponds to the "second capacitive coupling portion configured to be capacitively coupleable to the electrically conductive portion of the housing". Therefore, similar to the first embodiment, in the push switch 200 according to the second embodiment, the surface (electrically conductive portion 201A) of the housing 201 can be caused to function as a detection electrode, and a current value corresponding to a change in capacitance at the surface of the housing can be detected. Therefore, whether or not the operation body 10 is in proximity can be determined based on the current value. Accordingly, in the push switch 200 according to the second embodiment, the pressing member 202 (movable part) is not equipped with a proximity sensor, thereby increasing the degree of freedom in arranging components and extending the life of the push switch 200.

Further, in the push switch 200, the area where the side wall portion 202C overlaps with the electrically conductive portion 201A changes in accordance with the amount of operation of the pressing member 202. Accordingly, the push switch 200 can be configured such that the capacitance at the electrically conductive portion 201A changes in accordance with the amount of operation of the pressing member 202.

Third Embodiment

Figure 7A:
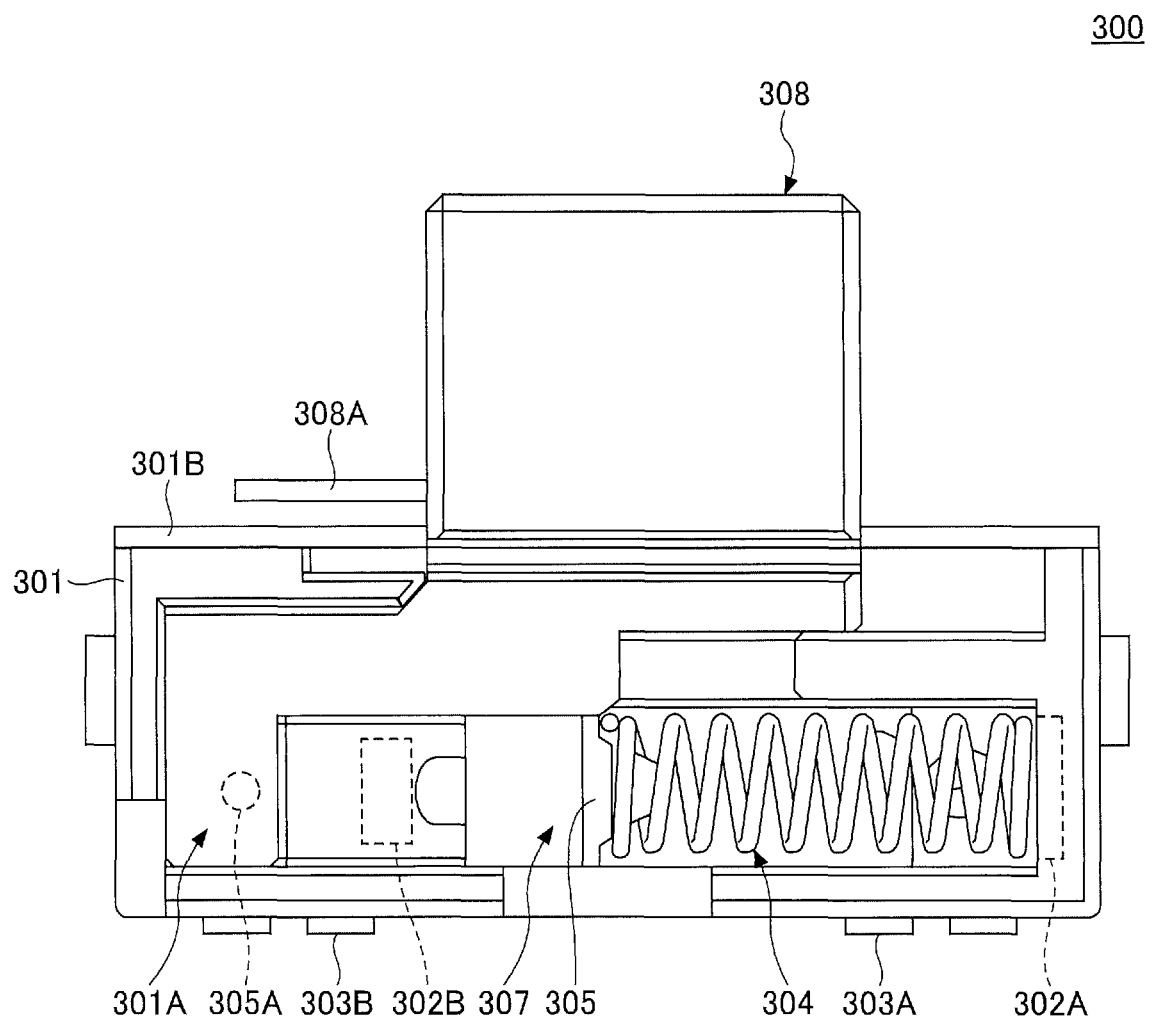
FIG. 7A is a plane view of a slide switch according to a third embodiment.
Figure 7A:
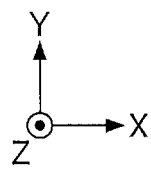
Figure 7B:
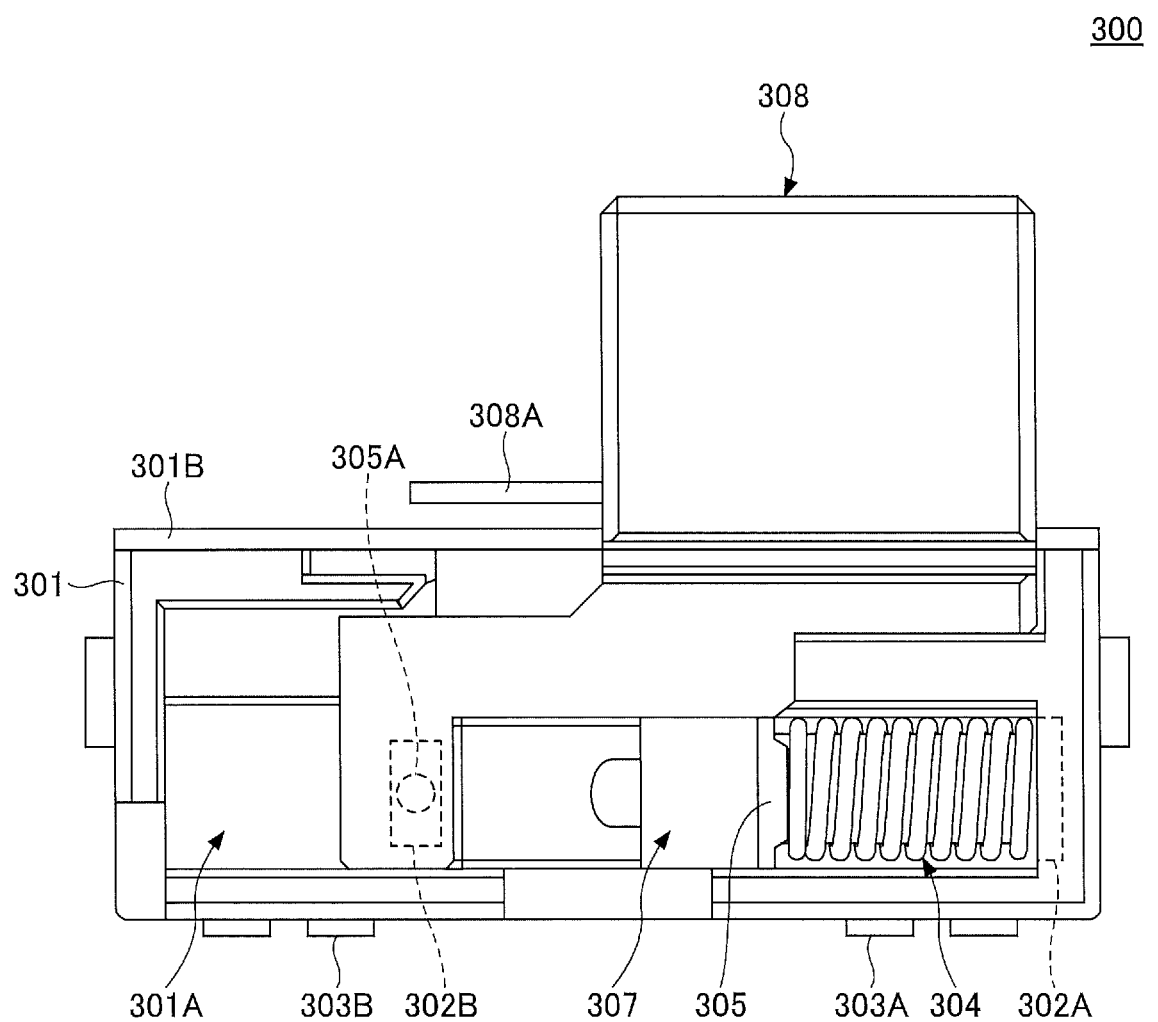
FIG. 7B is a plane view of the slide switch according to the third embodiment.

Next, a slide switch according to a third embodiment will be described with reference to FIG. 7A and FIG. 7B. FIG. 7A and FIG. 7B are plan views of a slide switch 300 according to the third embodiment.

The slide switch 300 illustrated in FIG. 7A and FIG. 7B are what is known as a self-return slide switch. As illustrated in FIG. 7A and FIG. 7B, the slide switch 300 includes a housing 301, fixed contacts 302A and 302B, connection terminals 303A and 303B, a coil spring 304, a movable contact 305, a holding member 307, and a sliding member 308. The slide switch 300 includes a cover (not illustrated) that covers the upper part of a space 301A of the housing 301. However, in FIG. 7A and FIG. 7B, the cover is removed from the slide switch 300.

The housing 301 houses and holds the components (the fixed contacts 302A and 302B, the connection terminals 303A and 303B, the coil spring 304, the movable contact 305, the holding member 307, and the sliding member 308).

The sliding member 308 can slide in the X-axis direction with respect to the housing 301 in response to an operation by an operator.

The holding member 307 is provided in the space 301A of the housing 301 and holds the movable contact 305. The holding member 307 slides in the X-axis direction together with the sliding member 308.

The coil spring 304 is provided on the positive X-side relative to the holding member 307, and such that the coil spring 304 can elastically deform in the X-axis direction. The coil spring 304 biases the holding member 307 and the sliding member 308 to the negative X-side. Accordingly, the sliding member 308 can return to the initial position upon the sliding member 308 being released by the operator. The end portion on the positive X-side of the coil spring 304 contacts the fixed contact 302A. The end portion on the negative X-side of the coil spring 304 contacts the movable contact 305.

The movable contact 305 is held by the holding member 307, and slides in the X-axis direction together with the holding member 307. The movable contact 305 is formed of an electrically conductive material. The movable contact 305 contacts the end portion on the negative X-side of the coil spring 304, and is electrically connected to the fixed contact 302A via the coil spring 304. The movable contact 305 includes a contact portion 305A, and the movable contact 305 slides in the positive X-direction upon the sliding of the sliding member 308 by the operator. As a result, the contact portion 305A is electrically connected to the fixed contact 302B (see FIG. 7B). That is the slide switch 300 enters an on-state. Conversely, the movable contact 305 slides in the negative X-direction upon the sliding member 308 being released by the operator. As a result, the contact portion 305A is electrically disconnected from the fixed contact 302B (see FIG. 7A). That is, the slide switch 300 enters an off-state.

The connection terminals 303A and 303B are provided on the side surface of the housing 301, and are connected to an external device (subjected to a switching operation by the slide switch 300). The connection terminals 303A and 303B are formed of electrically conductive materials. The connection terminal 303A is electrically connected to the fixed contact 302A. The connection terminal 303B is electrically connected to the fixed contact 302B.

The fixed contact 302A is provided in the space 301A of the housing 301, and contacts the end portion on the positive X-side of the coil spring 304. The fixed contact 302B is provided within the space 301A of the housing 301. The fixed contacts 302A and 302B are formed of electrically conductive materials.

In the slide switch 300 having the above-described configuration, the sliding member 308 is in the initial position by the biasing force of the coil spring 304 when a sliding operation is not performed by the operator as illustrated in FIG. 7A. At this time, the contact portion 305A of the movable contact 305 is not electrically connected to the fixed contact 302B. Accordingly, the fixed contact 302A is not electrically connected to the fixed contact 302B (that is, the slide switch 300 is in the off-state).

Conversely, upon the sliding operation being performed by the operator, the movable contact 305 slides in the positive X-direction together with the sliding member 308 as illustrated in FIG. 7B. As a result, the contact portion 305A of the movable contact 305 is electrically connected to the fixed contact 302B. Accordingly, the fixed contact 302A is electrically connected to the fixed contact 302B via the movable contact 305 and the coil spring 304 (that is, the slide switch 300 enters the on-state).

Further, upon the sliding member 308 being released by the operator, the sliding member 308 returns to the initial position by the biasing force of the coil spring 304. Accordingly, the slide switch 300 enters the off-state in which the fixed contact 302A is not electrically connected to the fixed contact 302B as illustrated in FIG. 7A.

The sliding member 308 includes a capacitive coupling portion 308A having a flat plate shape. The capacitive coupling portion 308A is spaced apart from the side surface of the housing 301 by a given distance and is in parallel to the side surface of the housing 301. Further, the sliding member 308 including the capacitive coupling portion 308A is formed of an electrically conductive material (such as an electrically conductive resin). In addition, an electrically conductive portion 301B is formed on at least a part of the surface of the housing 301 facing the capacitive coupling portion 308A. Accordingly, in the slide switch 300 according to the third embodiment, the sliding member 308 can be capacitively coupled to the operation body (such as a user's finger) and the surface of the housing 301. Note that a portion of the sliding member 308 protruding from the housing 301 corresponds to the "first capacitive coupling portion configured to be capacitively coupleable to the operation body", and the capacitive coupling portion 308A corresponds to the "second capacitive coupling portion configured to be capacitively coupleable to the electrically conductive portion of the housing". Therefore, similar to the first embodiment, in the slide switch 300 according to the third embodiment, the surface (electrically conductive portion 301B) of the housing 301 can be caused to function as a detection electrode, and a current value corresponding to a change in capacitance at the surface of the housing 301 can be detected. Therefore, whether or not the operation body 10 is in proximity can be determined based on the current value. Accordingly, in the slide switch 300 according to the third embodiment, the sliding member 308 (movable part) is not equipped with a proximity sensor, thereby increasing the degree of freedom in arranging components and extending the life of the slide switch 300.

Further, in the slide switch 300, the area where the capacitive coupling portion 308A overlaps with the electrically conductive portion 301B changes in accordance with the amount of operation of the sliding member 308. Accordingly, the slide switch 300 can be configured such that the capacitance at the electrically conductive portion 301B changes in accordance with the amount of operation of the sliding member 308.

Fourth Embodiment

Figure 8:
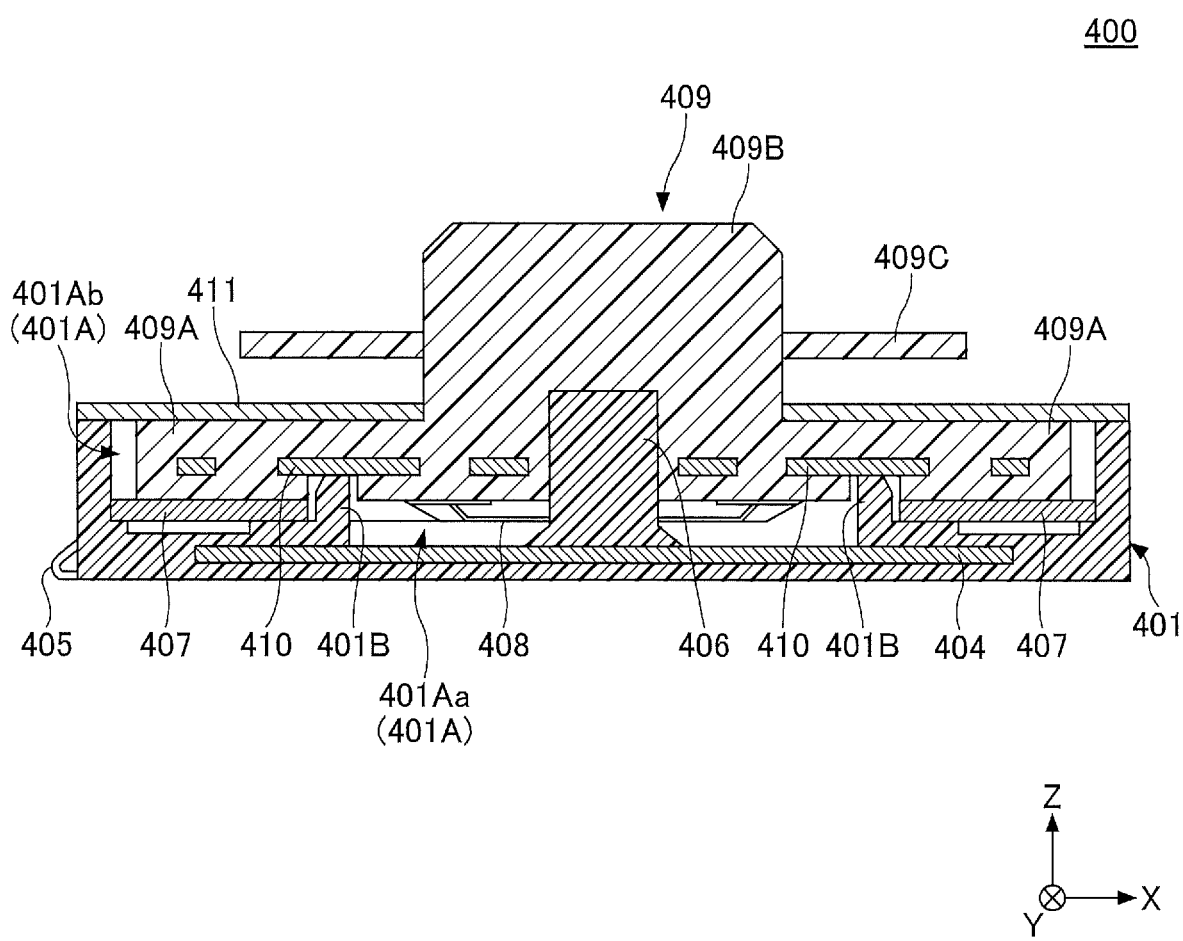
FIG. 8 is a cross-sectional view of a rotary switch according to a fourth embodiment.

Next, a rotary switch according to a fourth embodiment will be described with reference to FIG. 8. FIG. 8 is a cross-sectional view of a rotary switch 400 according to the fourth embodiment.

As illustrated in FIG. 8, the rotary switch 400 includes a housing 401, a fixed contact 404, a plurality of connection terminals 405, a support shaft 406, a click plate 407, a movable contact 408, and a rotation member 409.

The housing 401 houses and holds the components (the fixed contact 404, the plurality of connection terminals 405, the support shaft 406, the click plate 407, the movable contact 408, and the rotation member 409). A housing space 401A is formed within the housing 401. The housing space 401A includes an inner peripheral space 401Aa and an outer peripheral space 401Ab. A dust-prevention wall 401 having an annular shape in planar view is provided between the inner peripheral space 401Aa and the outer peripheral space 401Ab. The upper part of the space 401 is closed by a retaining member 411 that has a flat plate shape. The retaining member 411 is formed of an electrically conductive material.

The fixed contact 404 is provided at the bottom of the inner peripheral space 401Aa. The fixed contact 404 includes an annular common contact and a plurality of individual contacts. The individual contacts are disposed outward relative to the common contact and are arranged on the same circumference. The common contact and the individual contacts are each connected to a corresponding connection terminal 405, among the plurality of connection terminals 405 that protrude to the outside of the housing 401.

The support shaft 406 is disposed at the center of the bottom of the inner peripheral space 401Aa and protrudes upward. The support shaft 406 rotatably supports a base portion 409A of the rotation member 409.

The click plate 407 has an annular flat plate shape in planar view and is disposed at the bottom of the outer peripheral space 401Ab. For example, the click plate 407 is formed of a metal plate. The click plate 407 includes a plurality of click sensation generating portions arranged on the same circumference. Each of the click sensation generating portions has an opening.

The rotation member 409 includes the base portion 409A disposed at the center of the housing space 401A, and a holding portion 409B having a columnar shape and protruding from the center portion of the base portion 409A. The base portion 409A is rotatably supported by the support shaft 406. The holding portion 409B protrudes above the upper surface of the housing 401 (through the opening of the retaining member 411), and is configured to be rotatable by an operator. The rotation member 409 may be formed of a resin material, for example.

The movable contact 408 is an annular member that is disposed in the inner peripheral space 401Aa and fixed to the bottom surface of the rotation member 409 (base portion 409A). The movable contact 408 includes a first slider that is capable of sliding while contacting the common contact of the fixed contact 404, and a second slider that is capable of sliding while sequentially contacting the plurality of individual contacts.

An elastic member 410 is an annular member that is held by the rotation member 409 and formed of an elastic metal plate such as stainless steel. The elastic member 410 includes an engaging/disengaging portion that protrudes downward toward the click plate 407. The elastic member 410 rotates together with the rotation member 409. During this rotation, the engaging/disengaging portion of the elastic member 410 moves on the circumference of the click plate 407, thereby sequentially engaging with and disengaging from the click sensation generating portions arranged on the click plate 407. As a result, the elastic member 410 can provide a click sensation when the rotation member 409 rotates.

In the rotary switch 400 having the above-described configuration, upon the rotation member 409 being rotated by the operator, the movable contact 408 and the elastic member 410 rotate together with the rotation member 409. Accordingly, the common contact of the fixed contact 404 is sequentially electrically connected to the plurality of the individual contacts via the movable contact 408. At this time, the engaging/disengaging portion of the elastic member 410 sequentially engages with and disengages from the click sensation generating portions of the click plate 407 arranged on the same circumference. In this manner, the rotary switch 400 provides a click sensation when the rotation member 409 rotates.

The rotation member 409 includes a capacitive coupling portion 409C. The capacitive coupling portion 409C has a horizontal flat plate shape. The capacitive coupling portion 409C extends outward from the outer peripheral surface of the holding portion 409B along the outer periphery of the holding portion 409B. The capacitive coupling portion 409C is spaced apart from the retaining member 411, constituting the upper surface of the housing 401, by a given distance, and is in parallel to the retaining member 411. The rotation member 409 including the capacitive coupling portion 409C is formed of an electrically conductive material (such as an electrically conductive resin). In addition, the retaining member 411 constituting the upper surface of the housing 401 is formed of an electrically conductive material (such as a metal plate). Accordingly, in the rotary switch 400 according to the fourth embodiment, the rotation member 409 can be capacitively coupled to the operation body (such as a user's finger) and to the retaining member 411 constituting the upper surface of the housing 401. Note that the holding portion 409B of the rotation member 409 corresponds to the "first capacitive coupling portion configured to be capacitively coupleable to the operation body", and the capacitive coupling portion 409C corresponds to the "second capacitive coupling portion configured to be capacitively coupleable to the electrically conductive portion of the housing". Therefore, similar to the first embodiment, in the rotary switch 400 according to the fourth embodiment, the upper surface (retaining member 411) of the housing 401 can be caused to function as a detection electrode, and a current value corresponding to a change in capacitance at the upper surface of the housing 401 can be detected. Therefore, whether or not the operation body 10 is in proximity can be determined based on the current value. Accordingly, in the rotary switch 400 according to the fourth embodiment, the rotation member 409 (movable part) is not equipped with a proximity sensor, thereby increasing the degree of freedom in arranging components and extending the life of the rotary switch 400.

Further, in the rotary switch 400, the area where the capacitive coupling portion 409C overlaps with the retaining member 411 changes in accordance with the amount of operation of the rotation member 409. Accordingly, the rotary switch 400 can be configured such that the capacitance at the retaining member 411 changes in accordance with the amount of operation of the rotation member 409.

What is claimed is:

1. An operation device comprising:
a housing including an electrically conductive portion formed on at least a portion of a surface thereof;
an operation lever that is supported by the housing such that the operation lever is tiltable in at least a forward-backward and a left-right direction in response to an operation by an operation body, and that is configured to be capacitively coupled to the operation body and to the electrically conductive portion, the operation lever including
a shaft that protrudes upward from the housing, and
an operation knob that is attached to the shaft; and
a detector configured to detect whether the operation body is in proximity to the operation member based on a change in capacitance at the electrically conductive portion, wherein the operation knob includes an operation portion configured to be operated by the operation body, and includes an umbrella portion that
curves outward;
extends downward from the operation portion; and
surrounds an outer periphery of the housing, and
an electrically conductive layer is provided on at least a portion of a surface of the operation portion and of the umbrella portion such that the entire surface of the operation lever is electrically conductive.

2. The operation device according to claim 1, wherein the operation member is electrically conductive, and includes an insulating layer on a surface thereof.

3. The operation device according to claim 2, wherein the electrically conductive portion is a frame portion constituting the surface of the housing.

* * * * *